July 11, 1967 R. L. ADAMS ETAL 3,330,691
PROCESS OF COATING PAPER WITH ATTAPULGITE CLAY
Filed Sept. 16, 1963

RONALD L. ADAMS
PHILIP C. CLARK
EDWARD A. HAWKINS
JOSAPHAT L. MONTGOMERY
INVENTORS

BY
AGENT

United States Patent Office 3,330,691
Patented July 11, 1967

3,330,691
PROCESS OF COATING PAPER WITH
ATTAPULGITE CLAY
Ronald L. Adams, Philip C. Clark, Edward A. Hawkins, and Josaphat L. Montgomery, Chillicothe, Ohio, assignors to The Mead Corporation, Dayton, Ohio, a corporation of Ohio
Filed Sept. 16, 1963, Ser. No. 309,306
2 Claims. (Cl. 117—155)

This invention relates to a process of blade coating pigment-adhesive compositions on paper webs and the like, and to products produced by this process. In particular, it is concerned with the production of attapulgite clay coated papers which are useful as the receiving sheet for manifold record material.

Manifold record material of this type usually consists of a transfer sheet in contact with a receiving sheet. The transfer sheet contains a colorless marking ink, such as crystal violet lactone dissolved in chlorinated diphenyl, which will be released in areas where pressure is applied to the sheet and will be available for transfer to sensitized surface of the receiving sheet. Color develops in the areas where the marking ink is transferred to the receiving sheet. Such a receiving sheet and process for making it are described in United States Patent No. 2,699,432 issued to Marra et al.

In the making of such a receiving sheet, the usual kaolin coating clays can not be used as they develop very little color when contacted with colorless marking inks such as crystal violet lactone. It is necessary to use a relatively acid, highly adsorbent, high ion exchange capacity pigment to develop this color. Such a material is attapulgus clay. Early formulations containing attapulgite clay as the principal pigment were made up at a low solids content, principally between 28 and 32% solids. These coatings were successfully applied by means of roll, reverse roll, or air knife coating to paper webs. Prior attempts at applying such a coating by means of a "trailing blade" coater, as illustrated in U.S. Patent No. 2,368,175 to Trist, met with failure due to the unfavorable rheological properties of the coating composition and the low water-binding capacity of attapulgite clay. The adhesive portion of this coating had a tendency to absorb into the paper web with a resulting buildup of the pigment concentration in the coating pond to the extent that after a short period of operation, no coating was being applied to the paper. This dewatering effect is typical of attapulgite clay, and is probably due in part to the fact that the attapulgite clay particles have a long needle-like structure instead of the plate-like structure of the kaolin coating clays, and are significantly less hydrophilic than kaolin clays. It is necessary to apply in the order of 5 pounds per 3300 square feet of the dried attapulgite clay coating composition in order to obtain a receiving sheet with the desired qualities.

Accordingly, it is an object of this invention to produce an attapulgite clay coated paper having the properties necessary to make a satisfactory sensitized receiving sheet for manifold record material, using a blade coater for application of the coating composition.

It is another object of this invention to provide a method of coating a paper web and the like with a pigment-adhesive composition, in which the pigment is essentially attapulgite clay, using a blade coater.

Another object of this invention is to provide a method of making a pigment-adhesive coating composition comprising predominately attapulgite clay, which composition can be applied to a paper web at relatively high coat weights by means of blade coaters.

Figure 1:
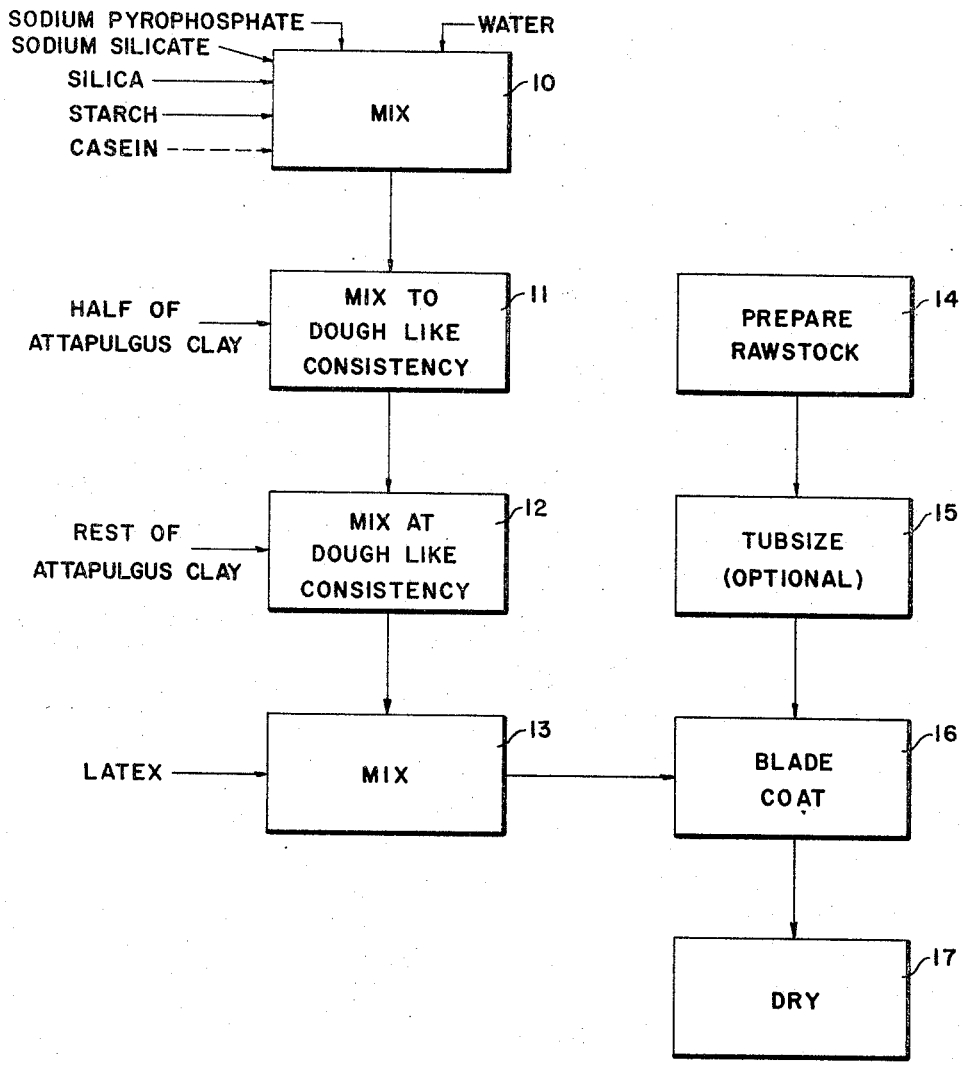
FIG. 1 is a flow diagram illustrating the process of preparing the product of this invention.

Referring to FIG. 1, the flow diagram shows the process steps for producing the receiving sheets of this invention. The attapulgite clay coating composition is prepared by mixing together the minor solid constituents, exclusive of the latex, with water, as shown at 10, adding and mixing about one half of the attapulgite clay, as shown at 11, adding while mixing the remainder of the attapulgite clay at a rate such that the resulting mixture maintains its dough like consistency, as shown at 12, and mixing in the latex, as shown at 13. The paper rawstock is prepared on a paper machine, as shown at 14, may be tubsized with an attapulgite clay tubsize, as shown at 15, is coated with the attapulgite clay coating composition, as shown at 16, and the coated paper is dried, as shown at 17, to yield a receiving sheet for manifold record material.

Figure 2:
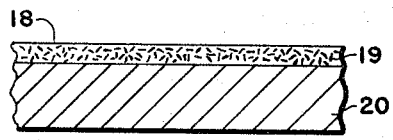
FIG. 2 is a side view, partly broken away, of a receiving sheet for manifold record material produced according to the process of this invention.

In FIG. 2, the receiving sheet 18 comprises a surface layer 19 containing clusters or bundles of attapulgite clay particles on a paper rawstock 20.

We have found that attapulgite clay coating compositions can be made which can be successfully coated on paper using a blade coater to consistently produce a receiving sheet having the desired sensitivity. The desired result is accomplished by a proper combination of the rheological properties and solids content of the coating composition, and adjustment and operation of the blade coater. Control of the rawstock surface characteristics is desirable but not critical to this process.

A wide variety of fiber furnishes may be used in making the paper rawstock. The principal requirement for a rawstock for use in the process of the instant invention is that the surface to be coated is preferably relatively rough. A rawstock having a Sheffield smoothness of the order of 200 to 250 for the surface to be coated is desired. The desired roughness of the rawstock surface may be obtained by omitting the smoothing press at the wet end of the paper machine, tubsizing with starch, and/or omitting one or more nips on the paper machine calender. Alternatively, the rawstock may be manufactured by running the paper through the smoothing press at the wet end as usually and tubsizing on the side to be coated with a pigmented tubsize, preferably containing attapulgite clay. A rawstock prepared in this manner using attapulgite clay pigmented tubsize does not need as heavy a film of coating composition to obtain the desired characteristics of the finished sheet as when an unpigmented tubsize is used. In this instance, the coating surface roughness of the rawstock can be substantially reduced. For example, a pigmented tubsized rawstock having a Sheffield smoothness in the order of 135 was found to produce a receiving sheet of satisfactory sensitivity when coated with 3 pounds of dried coating per 3300 square feet by the process of this invention.

Preparation of the coating composition is critical. The attapulgite clay should not be completely dispersed as the adhesive is then adsorbed substantially over the entire surface area of the pigment particles, and as a consequence the sensitivity of the receiving sheet is significantly reduced to a completely unacceptable level. For maximum sensitivity, the attapulgite clay should be present in the coating composition in the form of clusters or bundles of needle-like particles. High shear mixing at high consistencies, such as is obtained by batch kneading with a sigma blade mixer in the preparation of the usual kaolin coating compositions, is not desirable as it breaks up these bundles and produces too high a degree of dispersion of the attapulgite pigment. Receiving sheets made with coating compositions prepared similar to the usual kaolin coating compositions have been found to be greatly deficient in sensitivity. The use of lower consistencies than normal during sigma blade mixing has been found to improve sensitivity, but this does not produce a coating composition which can be coated on a blade coater in sufficient thickness to give a coated sheet of high quality. Moreover, the consistency during kneading, which determines the sensitivity of the resultant coated sheet, has been found to vary from batch to batch and is very difficult, if not impossible, to control.

We have found that a coating composition of exceptional sensitivity and having acceptable blade coating characteristics can consistently and easily be made by lower shear mixing such as is obtained with a propeller type mixer. A Struthers-Wells mixer having a central propeller and baffles extending in from the perimeter of the tank and which is modified for heavy duty mixing by strengthening the propeller, lengthening the baffles, and providing additional power for the propeller is particularly suitable for preparing quantities of coating composition satisfactory for this invention. In order to obtain the degree of dispersion of the attapulgite clay desired without loss of sensitivity, it is necessary to control the rate at which the attapulgite clay is added to the mix. Proper mixing is obtained when the mix has the consistency of bread dough at which time the agitation pattern is a slow rolling motion down and out from the center to the outside perimeter of the tank and up and back to the center again. To maintain this condition, the last half of the attapulgite clay must be added gradually, in small amounts, over a period of time.

Relatively high solids (38 to 42% solids), high viscosity (40 to 70 poises) colors have been made using this mixer which are particularly adaptable for use in blade coating to produce relatively high coat weights of the attapulgite clay coating composition. Receiving sheets made with these high solids, high viscosity coating compositions have been found to have superior sensitivity and aging characteristics. Dried coatings having more than the desired minimum coat weight of 5 pounds per 3300 square feet can be easily obtained using the process of this invention.

In blade coaters, metering and distribution are accomplished by means of a flexible blade. Metering can be either predominately "gravure" or "hydrodynamic." In gravure metering, the surface smoothness of the rawstock is important in controlling the thickness of the applied coating as the blade scrapes off the coating at the high points of the rawstock and fills in the low spots. By reducing the blade loading, liquid coating passes between the blade in all areas of the rawstock and is deposited as a continuous film of coating on the rawstock. Metering under these conditions becomes a combination of gravure and hydrodynamic metering. With a rawstock of constant surface roughness, the amount of coating composition applied to the paper by gravure metering would be constant, and the amount of coating composition applied by hydrodynamic metering would be affected by the rheological properties and solids content of the coating composition and the blade loading (as defined by the blade stiffness and geometry) of the blade coater. Thus, the rheological properties and solids content of the coating composition under the high shear conditions prevailing at the point of metering, have an important bearing on the thickness of the film of applied coating. For example, the higher the viscosity and solids content under these conditions, the higher the resulting coating weight.

After the coating composition has been applied to the paper rawstock and dried thereon, it may be desirable to apply water or a thin starch solution to the backside of the sheet followed by drying to control curl.

Prior to this invention, attapulgite clay coating compositions having the correct rheological properties for blade coating and which would produce a satisfactory receiving sheet for manifold record material were not available. The following examples are illustrative of the invention.

*Example 1*

Using a furnish of 45 parts hardwood kraft pulp, 30 parts softwood kraft pulp, and 25 parts hardwood and softwood kraft broke with 3 parts of filler clay, 0.8 parts of rosin size, and 2.0 parts of alum, a rawstock having a basis weight of 33.8 pounds per 3300 square feet was made on a paper machine. The rawstock was tubsized on the paper machine with 6% enzyme converted pearl starch. This rawstock was made in the normal manner for coating rawstock except that the wet smoothing press was not used, and the dried paper web was only lightly calendered by running through 3 nips on the paper machine calender. It had a Sheffield smoothness of approximately 225 on the wire side.

A coating having the following composition was prepared in a modified Struthers-Wells mixer.

|  | Percent (Dry Solids) | Parts by Weight |
| --- | --- | --- |
| Attapulgite clay (96%) | 70 | 2,190 |
| Sodium pyrophosphate | 1 | 30 |
| Silica pigment (95%) | 8 | 253 |
| Sodium silicate (38.8% solids) | 5 | 395 |
| Casein (20% solids) | 1 | 150 |
| Oxidized starch (20% solids) | 1 | 150 |
| Butadiene-stryrene latex (48% solids) | 14 | 875 |

The casein was prepared by dispersing 100 parts of casein in water containing 7.75 parts of soda ash, 4.45 parts of sodium hydroxide, 1.7 parts of borax, and 6.35 parts of dicyandiamide to give an aqueous dispersion of 20% casein. The starch, casein dispersion, sodium pyrophosphate, and sodium silicate were added to 3340 parts of water in the mixer. After these materials were thoroughly mixed, the silica pigment was added and mixed in thoroughly. About half of the attapulgite clay was added to the above mix as quickly as possible and mixed to a dough-like consistency, after which the rest of the attapulgite clay was added over a period of about ninety minutes during which time the doughlike consistency of the mix was kept constant by controlling the rate at which the clay was added. After all the clay had been added, the latex was added and thoroughly mixed, and the resulting coating composition was screened before using. The solids content of the composition was 41% and the MacMichael viscosity was 50 poises.

The coating composition prepared as above was coated onto the wire side of the paper rawstock using a puddle type blade coater. A 3 inch wide blade having a thickness of .012 inch and extending beyond the blade holder about 1 inch was used for metering and distributing the coating. The blade holder was set so that the plane of the undeflected blade and the plane tangent to the web at the line of intersection of the web and the plane of the undeflected blade was 55.5°. The blade loading was of the order of 140 pounds per square inch. At a coating speed of 850 feet per minute the dried coating weighed 5.3 pounds per 3300 square feet. During the coating operation, the coating composition was continuously recirculated through the puddle, and the MacMichael viscosity of the coating color in the puddle was continuously adjusted to a value between 40 and 70 poises by adding casein solution to increase the viscosity or water to decrease the viscosity. The resultant coated and dried sheet was calendered using 4 nips on a machine calender. It had a sensitivity value of 51.9 and was found to be satisfactory as a receiving sheet for the marking ink in manifold record material.

The sensitivity value of the receiving sheet was measured as follows: An assembly of the receiving sheet, with a portion of the area of the sensitized coated side in contact with a transfer sheet containing a colorless marking ink, was passed between steel rolls. A reflectometer is used to read the reflectance of the resulting colored area and of the white uncolored area and the sensitivity value is determined as follows:

$$\text{Sensitivity value} = \frac{\text{Reflectance of colored area} \times 100}{\text{Reflectance of uncolored area}}$$

It is obvious from the above relationship that receiving sheets which develop high color (high actual sensitivity) would have a low sensitivity value. The desired sensitivity value for best results with a white receiving sheet of this particular type is in the range of 45 to 55.

*Example 2*

Using a furnish of 50 parts softwood kraft, 35 parts hardwood kraft, and 15 parts softwood and hardwood kraft broke with 1 part rosin size, and 3.0 parts of alum, a rawstock having a basis weight of 34.3 pounds per 3300 square feet was made on a paper machine. The rawstock was tubsized on the paper machine on the wire side with an aqueous dispersion of 28% solids of the following composition, applying approximately 1.5 pounds of dry solids per 3300 square feet.

| | Percent (dry solids) |
|---|---|
| Attapulgite clay | 66 |
| Bentonite clay | 5 |
| Sodium silicate (38.8% solids) | 5 |
| Sodium pyrophosphate | 1 |
| Hydroxyethylated starch (20% solids) | 8 |
| Butadiene-styrene latex (48% solids) | 15 |

This rawstock was made in the normal manner for coating rawstock. It had a Sheffield smoothness after tubsizing of approximately 135 on the wire side.

A coating having the following composition was prepared using the mixer of Example 1.

| | Percent (Dry Solids) | Parts by Weight |
|---|---|---|
| Attapulgite clay (96% solids) | 70 | 2,190 |
| Sodium pyrophosphate | 1 | 30 |
| Silica pigment (95% solids) | 10 | 16 |
| Sodium silicate (38.8% solids) | 5 | 395 |
| Oxidized starch (20% solids) | 3 | 450 |
| Butadiene-styrene latex (48% solids) | 11 | 685 |

In preparing this coating composition, the procedure of Example 1 was used, except that the starch, sodium pyrophosphate and sodium silicate were added to 4000 pounds of water in the mixer. The resulting composition contained 39% solids and had a MacMichael viscosity of 40 poises.

The coating composition was coated on the attapulgite clay tubsized rawstock using a puddle type blade coater as in Example 1. A dried coating having a weight of 3 pounds per 3300 square feet was applied. The sensitivity value of the resultant coated sheet was 49, and the sheet was satisfactory as a receiving sheet in manifold record material.

*Examples 3 to 5*

The following coating compositions were prepared at approximately 41% solids as in Example 1, and coated on the rawstock of Example 1 using a blade coater, as set forth therein.

| | Percent (Dry Solids) | | |
|---|---|---|---|
| | Example 3 | Example 4 | Example 5 |
| Attapulgite clay | 75 | 64 | 74 |
| Sodium pyrophosphate | 0.5 | 1 | 1 |
| Silica pigment | 4 | 8 | 5 |
| Sodium silicate | 5 | 5 | 4 |
| Casein (Caustic cut) | 0.5 | 1 | 1 |
| Oxidized starch | 1 | 1 | 1 |
| Butadiene-styrene latex | 14 | 18 | 14 |
| Bentonite clay | 0 | 2 | 0 |

Approximately 5 pounds of dried coating per 3300 square feet were applied in each case. The resultant sheets produced in Examples 3 through 5 had sensitivity values of respectively 52.6, 52, and 50 and were satisfactory for use as receiving sheets in manifold record material.

While the foregoing examples illustrate the essential features of the invention, it is obvious that other modifications and/or equivalents may be employed without departing from the scope of the invention.

What is claimed is:

1. In a process of coating a paper web to produce a receiving sheet for manifold record material comprising the steps of preparing an aqueous coating composition of 38 to 42% solids comprising predominantly attapulgite clay in the form of clusters or bundles of needle-like particles with minor amounts of other solid constituents including a latex, and applying a metered film of said coating composition on a paper rawstock using a blade coater adapted for hydrodynamic metering said coating composition, the improvement which consists of the steps of preparing in the form of a dough like consistency an aqueous mixture of the solid constituents of said coating composition omitting said latex and including approximately one-half of the total attapulgite clay content, adding to said mixture while mixing the remainder of said attapulgite clay at a rate such that the resulting mixture maintains its dough like consistency and mixing in said latex to form said coating composition.

2. A process of coating a paper web to produce a receiving sheet for manifold record material comprising the steps of making a paper rawstock having a Sheffield smoothness on one side of said paper rawstock of the order of 200 to 250, preparing an aqueous coating composition of 38 to 42% total solids comprising in the range of 64 to 75 parts attapulgite clay per 100 parts of solids with minor amounts of sodium pyrophosphate, silica pigment, sodium silicate, starch, and butadiene-styrene latex, said preparation step being accomplished by forming a mix of said sodium pyrophosphate, said sodium silicate, said starch, and said silica pigment with water, adding about one half of said attapulgite clay to said mix and mixing to a dough like consistency, thereafter adding while mixing the remainder of said attapulgite clay at a rate such that the resulting mixture maintains its dough like consistency whereby the attapulgite clay is dispersed in the form of clusters or bundles of needle-like particles and mixing in said latex to form said coating composition, applying a metered film of said coating composition on said one side of said paper rawstock using a blade coater adapted for hydrodynamic metering of said coating, and drying said coated paper.

References Cited

UNITED STATES PATENTS

| | | | |
|---|---|---|---|
| 2,237,068 | 4/1941 | Bradner | 117—156 XR |
| 2,337,737 | 12/1943 | Champion | 117—36.2 XR |
| 2,548,366 | 4/1951 | Green | 117—36.2 XR |
| 2,581,186 | 1/1952 | Green | 117—156 XR |
| 3,044,896 | 7/1962 | Warner | 117—156 XR |
| 3,152,918 | 10/1964 | Kraus | 117—156 XR |
| 3,223,546 | 12/1965 | Hemstock | 117—36.2 XR |

MURRAY KATZ, *Primary Examiner.*